May 26, 1959
H. A. TOULMIN, JR
2,888,353
METHOD AND APPARATUS FOR CONCENTRATING JUICES
Filed Dec. 29, 1954
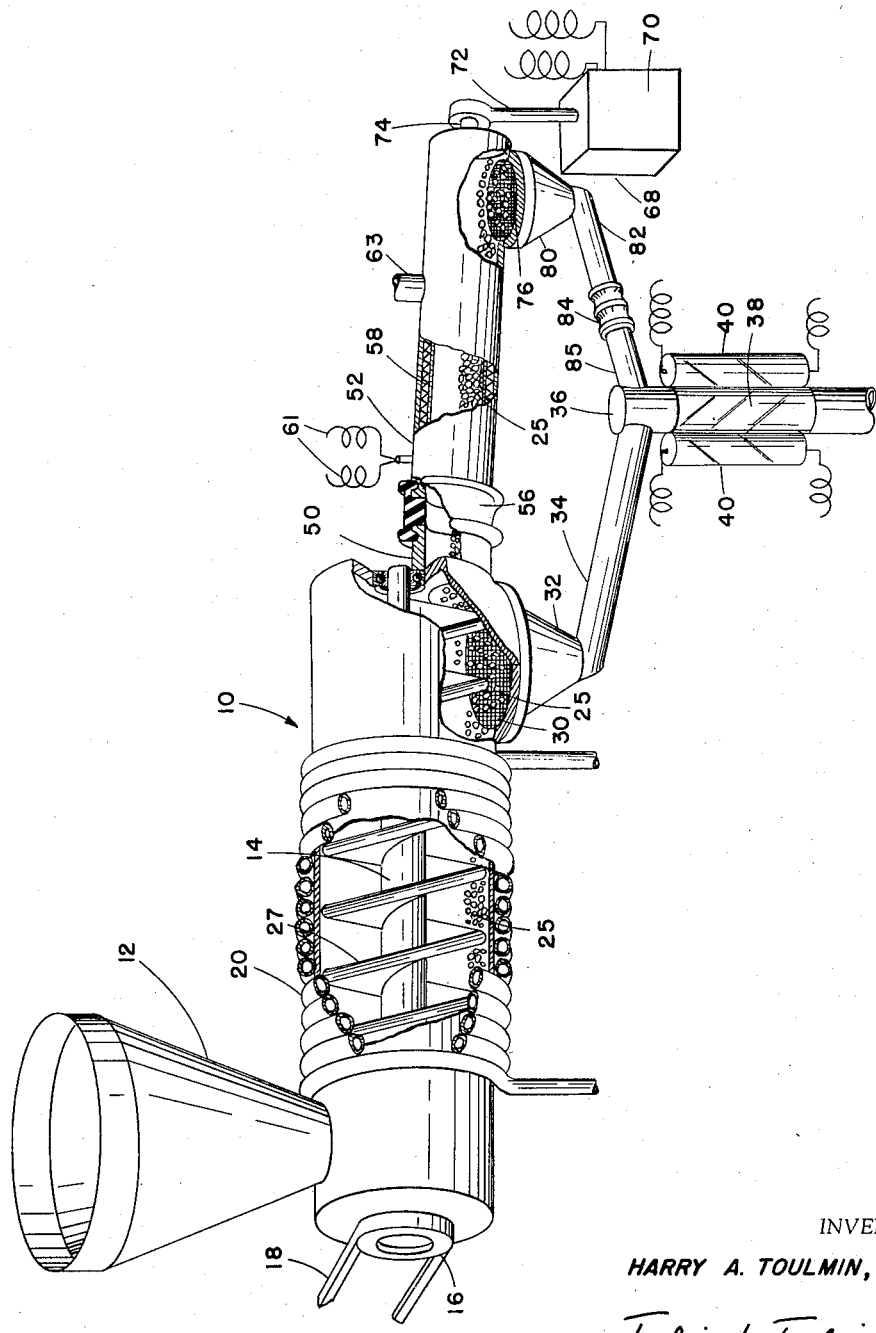
INVENTOR
HARRY A. TOULMIN, JR.
BY  *Toulmin & Toulmin*
ATTORNEYS United States Patent Office 2,888,353
Patented May 26, 1959

2,888,353

METHOD AND APPARATUS FOR CONCENTRATING JUICES

Harry A. Toulmin, Jr., Dayton, Ohio, assignor, by mesne assignments, to Union Carbide Corporation, New York, N.Y., a corporation of New York Application December 29, 1954, Serial No. 478,420

2 Claims. (Cl. 99—205)

This invention relates generally to a method and apparatus for dehydrating substances, especially the dehydration of fruit and vegetable juices or the like liquids containing water as a constituent.

The dehydration of fruit and vegetable juices has become of considerable importance commercially in recent years. Such dehydration and concentration of juices enables producers to utilize fully ripened fruits and vegetables and to extract the juices therefrom and then package them in compact containers in which they are shipped to the market and eventually sold to the consumer. In the marketing of such juices it is a great advantage to reduce the product to a relatively small volume by removing the water constituent and providing a concentrated juice which may be readily preserved, and because of its reduction in bulk, stored at less cost.

Prior art methods of dehydrating such juices to the desired Brix or concentrate have generally required the use of evaporators, vacuum pans, and the like, and wherein heat is applied to the juice to cause evaporation and removal of the water constituent from the juice. While such a procedure has been successful in effecting the dehydration of the juice it is also accompanied by the objectionable feature in that substantial amounts of the aromatic volatile constituents of the juice are removed or lost due to the application of heat and sub-atmospheric pressures. Such treatment results in changing the original natural flavor of the juice which, of course, is not desired, and an attempt has been made to overcome this by the addition of cut-backs of fresh juices or flavoring extracts.

The result of dehydrating juices according to the prior art has been that such juices when reconstituted as by the addition or dilution thereof by water do not have the taste and good flavor as the fresh juices and are thus not attractive to the consumer. Accordingly, the sale of such dehydrated products has not been as large as it should be.

It is the principal object of the present invention to provide an improvement method and apparatus for effecting the dehydration of edible juices and the like substances containing water, and wherein the water is removed as ice crystals and wherein only the ice crystals, and any occluded juice or soluble solids occluded therein, are subjected to vacuum and heat treatment whereby all of the liquid and/or materials removed during the freezing out of the water as ice crystals is recovered.

Another object of the invention is to provide a method and apparatus for treating ice crystals such as formed and separated during freeze dehydration of juices and the like, in which the ice crystals are first subjected to refrigeration and mechanical agitation to separate the ice particles from adsorbed or mechanically held material, and then the resultant treated ice particles are subjected to heat and vacuum to melt the ice particles and recover a residue concentrate which may be combined with the original separated juice to produce a final product of the desired Brix value.

Another object of the invention is to provide a process of concentrating juices to a desired Brix, for example between 20–60, and preferably between about 38–45 Brix, which comprises subjecting the juice to freezing and then centrifuging the juice to recover the ice crystals which are formed therein during freezing, then thawing the ice, or at least a greater portion thereof, to release occluded soluble solids and any juice entrapped therein while at the same time evaporating water therefrom to produce a residue or auxiliary juice concentrate such that it can be admixed with the original freeze-dehydrated concentrate to form a final product having the desired Brix value.

A particular object of the invention is to provide a method and apparatus for treating ice crystals such as formed during freeze dehydration of fruit or vegetable juices and wherein the water is removed as ice crystals, the bulk of ice crystals being subjected to both mechanical separation and thawing, and finally to heat and sub-atmospheric pressure conditions to recover a resultant liquor containing a concentrate which includes released occluded soluble solids and/or juice.

Another object of the invention is to provide an apparatus and method for treating ice crystals containing occluded soluble solids which comprises agitating and moving the ice crystals along and onto a perforated support to recover mechanically occluded material from the ice crystals, and then subjecting the thus treated ice crystals to heat and vacuum to melt the ice crystals and release entrained soluble solids and/or juice, and evaporating at least a portion of the resulting liquor until the water content of the evaporated residue is of the desired concentration, and such as may be admixed or combined with the original frozen and centrifuged juice, from which the ice crystals were removed, to produce a finished product having the desired Brix value, e.g. between about 38 and 45 Brix.

A still further object of the invention is to provide a method and apparatus which is useful in freeze-dehydrating juices or the like for recovering occluded soluble solids and entrained juice from the ice crystals formed during refrigeration of the juice.

It is a still further object of the invention to provide a dehydration method and apparatus for treating fruit juices and the like which results in the rapid concentration of the juices and recovery of a concentrated juice. The juice is subjected to one or more freezing cycles, then centrifuged to recover the ice crystals formed. The ice crystals thus formed during freezing are heated to melt or thaw the same while simultaneously subjected to vacuum conditions to bring about evaporation of a large part of the water to recover occluded solids and juice material. The melted ice crystals and recovered juice is subjected to sterilization and recovered as a separate product, or may be combined with the original concentrated juice, as described, to provide a final juice concentrate.

These and other objects and advantages of the invention will become more apparent during the following description taken in conjunction with the accompanying drawing forming a part of this specification.

Referring to the drawing, there is illustrated an elongated drum or container 10 for receiving ice crystals, and such as may be conveyed thereto from a freeze tank centrifuge and discharged into a hopper 12 and communicating with the drum 10. A rotary screw agitator and conveyor 14 is arranged inside the drum 10. The screw agitator and conveyor means 14 is suitably driven by a pulley 16 which is drivingly connected by a V-belt 18 to a source of power such as a motor driven wheel, not shown.

Ice crystals, which are separated during the freezing of the juice and delivered to the hopper 12 pass into the interior of the drum 10 and are agitated while conveyed along, whereby ice crystals are separated into individual particles and rubbed together mechanically separating any surface adhering juice solids. Coils 20 are adapted to contain refrigerant to maintain the interior of the drum at a temperature such as will prevent any substantial melting thereof, at approximately 29–32° F.

Ice crystals, such as shown at 25, are conveyed along by the screw blades 27 of the conveyor 14 from the feed end of the conveyor to the opposite end, and thence over a perforated support or screen 30. During conveyance and agitation of the ice particles therealong in the drum 10, the ice crystals are mechanically separated or freed from each other and mechanically occluded matter is separated therefrom and moved along to the screen 30. This material consists of soluble solids and juice particles mechanically retained between the ice particles and adhering to the surface portions. The freed material passes through the screen 30 and into the receiver 32 flowing downwardly by gravity through a conduit 34 and into a collecting tube 36. Juice concentrate flowing from tube 36 is run into a container for storage and admixing with the original concentrate. A transparent portion 38 is provided in the tube 36 about which is arranged a set of ultra-violet lamps 40 for sterilizing the concentrate as it flows therethrough. The length of the sterilizing tube section 38 may be varied in order that the juice concentrate passing through the collector tube 36 is subjected to the sterilizing lamps 40 for a sufficient time to effect sterilization of the same.

After moving the ice crystals 25 across the perforated member or screen 30, the crystals are conveyed into the auxiliary tube 50 and thence into a vibrator tube 52 which is connected to the tube 50 by a flexible adaptor 56. This adaptor may be made of rubber or synthetic resilient material which is flexible and tough so that it can withstand the vibration of the tube 52. The tube 52 comprises electrical resistance heating coils 58 arranged therearound, and which are connected to an electric current source through the leads 61. Conduit 63 is connected to the upper portion of the tube 52 and communicates with the interior of the tube, the conduit 63 being connected to a suitable vacuum pump which creates a low pressure atmosphere in the interior of the tube 52.

In order to provide for vibrating and agitation of the ice crystals 25 in the utbe 52 and to assist in moving them along toward the end of the tube, there is provided a mechanical vibrating means 68 for reciprocating or vibrating the tube 52. This vibrating mechanism comprises motor and gear gox generally indicated at 70 for reciprocating a rod 72 which, in turn, is connected at its upper end to a stub shaft 74 fixed to the end wall of the tube 52, as illustrated in the drawings. Ice crystals 25 in the tube 52 are thus subjected to vibration, as well as heat and vacuum treatment to cause the ice crystals as they move along to melt and be partially evaporated. Melted material in tube 52 passes through the screen 76 located near the end of the tube 52 and is caught by a funnel-like receiver 80 which in turn is connected to a conduit 82. A flexible adaptor 84 interconnects conduit 82 with a conduit 85 which in turn is connected to the collector tube 36.

By utilizing flexible adaptor connections 56 and 84, it will be seen that the tube 52 and receptacle 80 and conduit 82 may be reciprocated or vibrated as a unit by the electrically operated mechanism 68.

The apparatus and method is readily adapted for use as an adjunct to freeze dehydration methods such as disclosed in U.S. patents to Wenzelberger 2,559,204 and 2,559,205. In such a freeze dehydration system, a plurality of freezing tanks as therein disclosed are employed for treating the juice to freeze dehydrate the same. Water is thus removed as ice crystals which are then transferred to the apparatus herein disclosed, and the crystals treated as described, to recover a resultant melted and evaporated concentrate.

In the fereze dehydration, for example of orange juice, by starting at a tank temperature of 23° F. above zero, with an outside temperature of 18° F., then a temperature in the next tank of 18° F., with an outside temperature of 13° F., then a tank temperature of 13° F., with an outside temperature of 8° F., and in the fourth tank, a temperature of 8° F., with an outside temperature of 3° F., and in the last tank, a temperature of 3° F., with an outside temperature of −2° F., free clear ice crystals can be secured that are easily maintained by a stirrer, in free movement, with minimum crystal size and the maximum freezing capacity for the temperature applied.

The foregoing freezing cycle for treating orange juice is typical and illustrates the principle utilizing a multiple series of freezing steps, starting with the temperature just about at the freezing point of the juice and progressively reducing and progressively removing water in the form of ice crystals. The ice crystals thus removed from the various tanks or freezing cycles may then be collected and transferred to the ice treating apparatus and method as herein disclosed.

While the freeze dehydration as carried out in the processes disclosed in the aforementioned patents generally produces ice crystals which are in most cases substantially free of occluded matter, it is impractical in commercial operation to produce 100% pure ice crystals. Accordingly, the apparatus and method of the present invention is particularly useful for recovering the thawed residue from the ice crystals as removed by freeze dehydration as described, and wherein such thawed ice crystals may also be subjected to evaporating conditions and the resultant concentrate combined with the original freeze dehydrated treated juice without affecting the flavor and good keeping qualities of the original freeze dehydrated juice.

By regulating the heating and evaporation treatment of the ice crystals in the vibrator tube 52 there may be recovered a juice having a Brix value of about 10–25% of that of the original juice and which may be then combined with the original freeze dehydrated juice to form a final product having a Brix value of, say, between 38–45. The concentrated juice or the like product may thus be treated to produce a final product having the desired Brix value and wherein there is substantially no loss of soluble solids nor impairment of the flavor constituent. This follows inasmuch as the juice being freeze dehydrated is not subjected to heat or vacuum treatment but only the ice crystals and occluded soluble solids and matter in accordance with the present process. Thus, the addition of the liquor or concentrated juice as recovered from the ice crystals may be combined with the original concentrate resulting from the freeze treatment and in which the ice crystals have been removed without any substantial changing of the natural aroma and flavor characteristic of the original juice.

As a modification of the above method, where desired a portion of the ice crystals passing through the tube 52 may be discarded without melting the same, especially where it appears that there are little or no remaining soluble solids or constituents of the original juice present. It is preferred, however, to effect a certain amount of melting of the ice crystals in the tube 52 in order that complete recovery may be made of any remaining constituents of the juice which may have been occluded in the ice crystals or adhering between the ice particles.

In the freeze dehydration of the juice, it is a desired practice to collect the ice crystals of the several freezing tanks or cycles into a common centrifuge wherein the same is subjected to centrifuging to remove the liquid portion and recover the ice crystals. Such ice crystals are then transferred to the voltaire 10 and treated in accordance with the present invention.

Suitable mechanism is provided for transferring the ice crystals from one tank to another and to a centrifuge for separation of the same from the mother liquor and then transferring the ice particles to the hopper 12 for separate treatment. A counter-flow of ice particles through the freezing tanks is provided to effect seeding of the freezing tanks, similarly as described in the patent to Wenzelberger referred to above.

It will be understood that the following claims comprehend various changes in the apparatus and method and that the same may be operated continuously or as a batch proposition. The method and apparatus is manifestly adapted for various changes and substitutions to suit the different conditions and materials being treated.

What is claimed is:

1. An apparatus for treating ice particles as recovered from freeze dehydrated fruit and vegetable juices and which have been subjected to a plurality of successive freezing cycles at progressively lower temperatures, said apparatus comprising an elongated drum for receiving said ice particles, means for agitating and conveying said ice particles from one end of said drum to the other, screening means arranged at one end of the drum for separating liquid portions from said ice particles, means comprising a tubular section communicating with said drum and forming a continuation thereof for heating and evaporating at least a portion of said ice particles, means for vibrating said tubular section to agitate the ice and move the same therethrough, a screen section arranged adjacent the outer end of said tubular section for recovering the liquid portion formed upon melting of said ice particles, means comprising a conduit for draining away said melted liquid portion, and means comprising ultra-violet lamps for sterilizing the juice recovered and flowing through said conduit.

2. A method for treating a mass of ice particles as recovered from freeze dehydrated fruit and vegetable juices and containing occluded juice, said method comprising moving said ice particles throught an elongated chamber and agitating and conveying the particles therealong from one end of the chamber to the other, maintaining the particles at a temperature of approximately 29 to 32° F. to prevent melting thereof, mechanically separating the ice particles from each other as the same is moved along to the opposite end of the chamber, screening the resultant separated ice particles when said mass of ice particles reach the end of said chamber to recover the juice retained between the ice particles and adhering to the surface thereof, then advancing the thus treated ice particles through a second chamber which communicates with and forms a continuation of said first chamber and wherein the ice particles are subjected to heat and vacuum and mechanical vibration to melt and evaporate at least a portion of said ice particles, and screening the residual ice particles left after said heat and vacuum treatment and which residual particles have advanced to the end of the continuation chamber and draining away the liquid juice portion to recover the same free of ice particles.

References Cited in the file of this patent

UNITED STATES PATENTS

| | | |
|---|---|---|
| 1,979,124 | Tival | Oct. 30, 1934 |
| 2,319,994 | Ketchum | May 25, 1943 |
| 2,482,507 | Rentschler et al. | Sept. 20, 1949 |
| 2,588,337 | Sperti | Mar. 11, 1952 |
| 2,616,604 | Folsom | Nov. 4, 1952 |
| 2,617,274 | Schmidt | Nov. 11, 1952 |
| 2,657,555 | Wenzelberger | Nov. 3, 1953 |